US006615875B2

(12) United States Patent
Adolphs et al.

(10) Patent No.: US 6,615,875 B2
(45) Date of Patent: *Sep. 9, 2003

(54) LINER FOR REINFORCING A PIPE AND METHOD OF MAKING THE SAME

(75) Inventors: Georg Adolphs, Sabadell (ES); Claude M. J. G. L. Renaud, Battice (BE)

(73) Assignee: Owens Corning Composites SPRL., Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 10/003,582

(22) Filed: Oct. 31, 2001

(65) Prior Publication Data
US 2002/0124898 A1 Sep. 12, 2002

Related U.S. Application Data

(63) Continuation-in-part of application No. 09/651,354, filed on Aug. 30, 2000, now Pat. No. 6,360,780.

(51) Int. Cl.$^7$ .............................................. F16L 55/162
(52) U.S. Cl. ..................... 138/98; 138/130; 138/154
(58) Field of Search ......................... 138/97, 98, 130, 138/154; 428/36.91, 58, 61, 102, 36.1; 405/150.1

(56) References Cited

U.S. PATENT DOCUMENTS

| 3,996,967 | A | | 12/1976 | Takada |
| 4,009,063 | A | | 2/1977 | Wood |
| 4,519,177 | A | * | 5/1985 | Russell ...................... 52/745 |
| 5,174,228 | A | * | 12/1992 | Grimnes ................. 112/262.1 |
| 5,445,875 | A | | 8/1995 | Persson |
| 5,535,786 | A | | 7/1996 | Makela et al. |
| 5,798,013 | A | | 8/1998 | Brandenburger |
| 5,799,705 | A | * | 9/1998 | Friedrich et al. ........... 138/144 |
| 5,868,169 | A | | 2/1999 | Catallo |
| 6,217,975 | B1 | * | 4/2001 | Daton-Lovett .............. 428/105 |
| 6,360,780 | B1 | * | 3/2002 | Adolphs et al. .............. 138/98 |

FOREIGN PATENT DOCUMENTS

| EP | 1085250 | 3/2001 |
| WO | WO 00/50801 | 8/2000 |

* cited by examiner

Primary Examiner—James Hook
(74) Attorney, Agent, or Firm—Inger H. Eckert; James J. Dottavio

(57) ABSTRACT

A reinforcement liner and methods of manufacturing the liner are disclosed. The liner includes a fabric (100) material having first and second fibers (112, 122). The second fibers comprise chopped fibers in substantially parallel alignment for being positioned substantially about the circumference of a pipe, so the fabric can be elongated in a direction parallel to the second fibers. The liner may includes a stitching material (130) that is used to couple the first and second fibers together. The stitching material is preferably an elastic yarn.

41 Claims, 14 Drawing Sheets

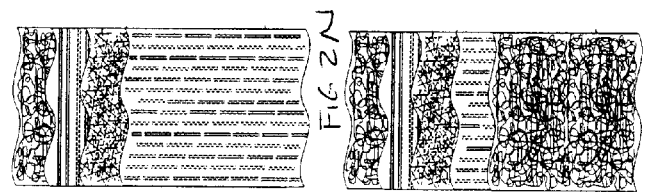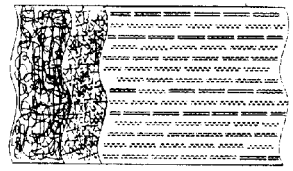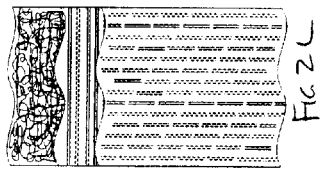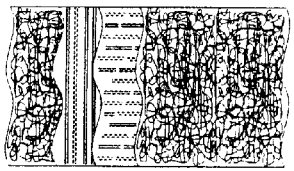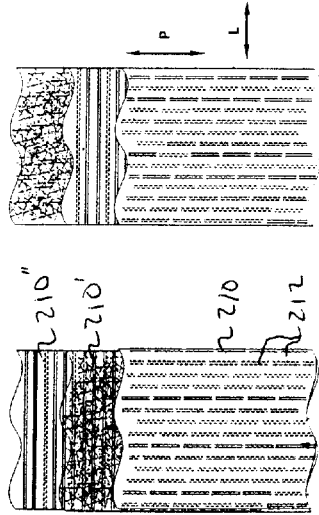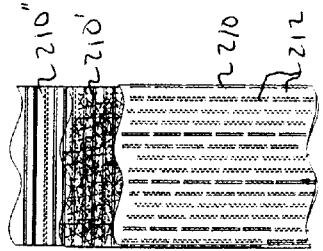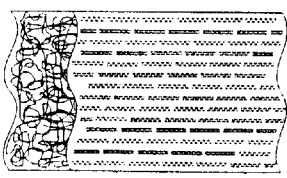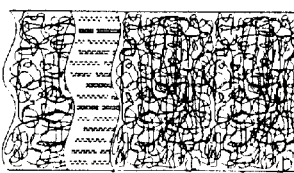

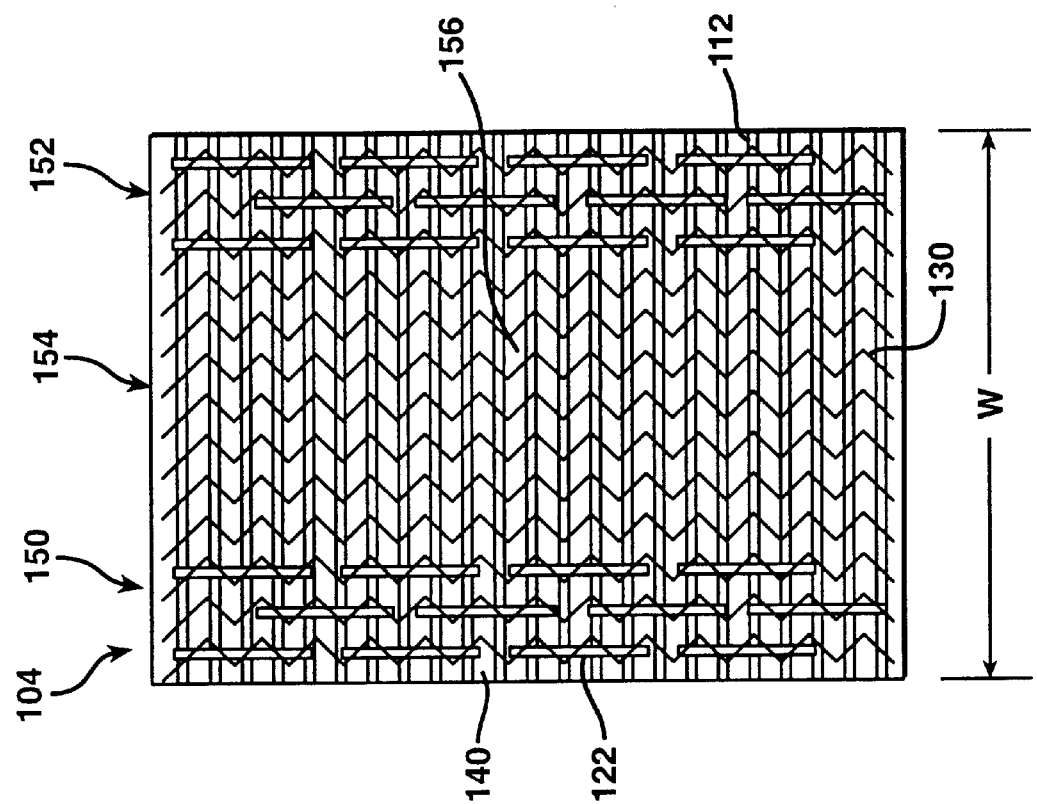
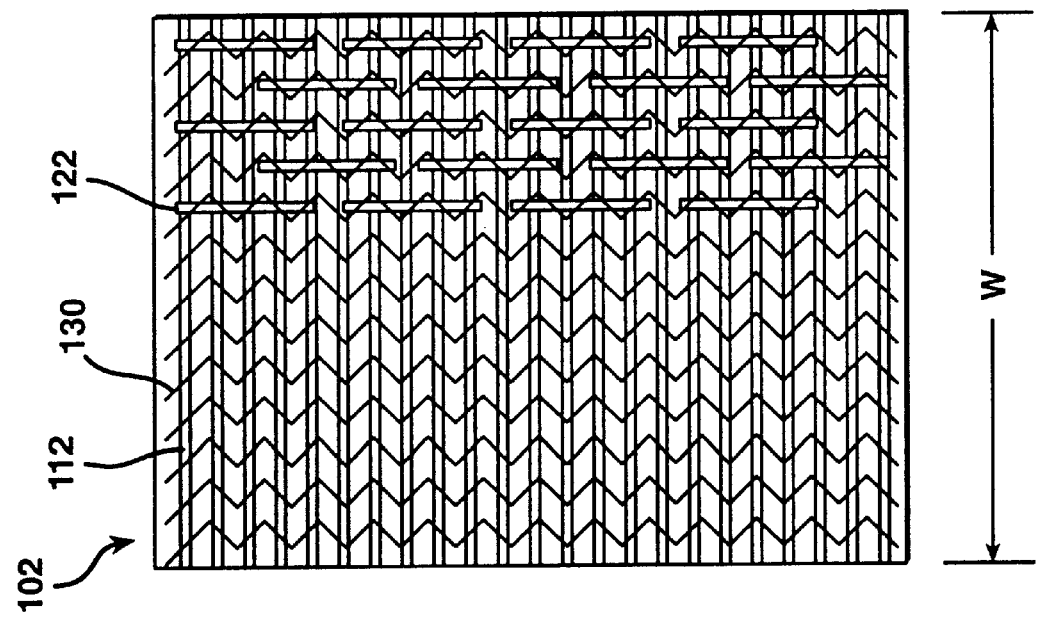

LINER FOR REINFORCING A PIPE AND METHOD OF MAKING THE SAME

This application is a continuation in part of U.S. patent application Ser. No. 09/651,354, filed on Aug. 30, 2000, now U.S. Pat. No. 6,360,780.

TECHNICAL FIELD AND INDUSTRIAL APPLICABILITY OF THE INVENTION

This invention relates to a liner for rehabilitating an underground piping system, and in particular, to a stretchable fabric that provides improved strength and stiffness for such rehabilitations. This invention also relates to a method of manufacturing such as a stretchable fabric. The invention is useful in the repair and rehabilitation of piping systems that are damaged and/or deteriorated.

BACKGROUND OF THE INVENTION

Underground piping systems are essential for transporting liquids and gases to homes and businesses. Utilities typically use these piping systems for sewer, water, gas, and other applications. Such piping systems are installed several feet underground and access to the piping systems is therefore limited.

Underground pipes experience cyclical loadings, premature wear, corrosion, porosity, and ambient foundation or earth movements. These factors contribute to the overall deterioration of the pipes. Often the pipes develop damaged or weakened areas requiring repair.

To maintain the service afforded by the underground piping system, any cracks or leaks must be promptly detected and repaired. Such repair generally requires the replacement of a long length of the pipe, since the repair of a small section of the pipe by welding, patching or otherwise, is usually unsatisfactory and difficult or even impossible because the pipe diameter does not allow human access in safe conditions. In the case of an underground pipe, the replacement of the pipe is difficult, expensive, and time consuming.

A solution for the repair of underground pipes is to repair a pipe while it is still in place. In-situ pipe repair procedures have been developed. Some procedures include the insertion of a pliable reinforcement liner into the damaged pipe. The liner typically has an outer diameter which is substantially the same as the inner diameter of the damaged pipe. The liner is pressurized so that it presses firmly along the inner wall of the damaged pipe. The expanded liner is then cured to form a new, rigid lining or surface within the original pipe.

There are several types of reinforcement or reinforcing liners. Some liners are made from a polyester material. Other liners utilize fibers that are impregnated with a synthetic resin. Fibrous mats are alternatively used as the material for a liner. Some reinforcement liners include glass fibers for support and strength, since glass fibers have a high strength and stiffness, while still possessing good resistance to elongation.

Some liners are hardened or cured after they have been installed. These liners are referred to as "cured-in-place (CIPP)" liners. The resin in a cured-in-place liner bonds or adheres to the glass or other reinforcement fibers after it is cured. Due to the bond between the resin and the fibers, the resin also becomes more resistant to stretching when axial or radial loads are applied to the cured liner. Thus, the cured resin is reinforced by fibers so long as the bond between the resin and glass fibers is not broken.

The liners are typically installed in environments that are continuously exposed to water and other corrosive materials. In particular, sewer pipelines, due to the presence of anaerobic bacteria develop hydrogen sulfide which, by oxidation develops diluted sulfuric acid in sewage water. These liners are also exposed to varying temperatures and flow conditions.

The liner inserted inside a pipe should have good flexibility to stretch and adjust itself to the host pipe diameter before cure, and must have good strength characteristics and adequate stiffness after cure to resist ground settlement or ground movement particularly if the host pipe has lost its required structural integrity.

Several different materials can be used as a liner to reinforce a pipe. An example of a known reinforcing material is disclosed in U.S. Pat. No. 5,535,786 to Makela et al ("Makela"). Makela discloses a material for reinforcing a flow conduit. The material includes a knitted fabric 5 and a felt layer 6 that are coupled together. Fabric 5 and layer 6 can be impregnated by a resin. As shown in FIG. 5 of Makela, fabric 5 includes filaments 3 that extend in the peripheral direction of the conduit for radial strength. Fabric 5 also includes yarn 1 that is formed with loops 2. Fabric 5 is an interlock or double-knitting type fabric in which the reinforcement filaments extend in a mutually parallel relationship through the loops 2.

Another example of a reinforcing liner is shown in U.S. Pat. No. 5,868,169 to Catallo ("Catallo"). Catallo discloses a tubular lining hose for rehabilitating a pipe. The lining hose 1 includes layers of resin absorbing material 2 and 4, a reinforcing fiber layer 3, and an outer covering layer 5.

Catallo discloses several embodiments of the lining hose. As shown in FIG. 1 of Catallo, the reinforcing fiber layer 3 includes longitudinal fibers 31 and radial fibers 32. A second embodiment, shown in FIG. 2, includes spaced radial fibers 34 which are separated by a distance greater than fibers 32. In FIG. 3, the fibers in layer 3 are oriented in a criss-cross helical pattern. Finally, in FIG. 4, layer 3 includes randomly oriented fibers 40 that are held together by cross-hatched stitching 42. The randomly oriented fibers 40 form a chopped strand mat.

Another example of a reinforcing lining is shown in U.S. Pat. No. 3,996,967 to Takada ("Takada"). Takada discloses a reinforcing matrix 3 that includes longitudinally extending fibers 1 and peripheral fibers 2, as shown in FIG. 1 of Takada. Fibers 1 are glass fibers which have a low elongation property. The peripheral fibers 2 have a high non-recoverable elongation and can be an unstretched polyester. Fibers 2 are non-recoverable to retain the shape of the lining once the lining has been set.

Another example of a reinforcing lining is shown in U.S. Pat. No. 4,009,063 to Wood ("Wood"). Wood describes a lining made from a laminate of randomly oriented non-woven felt and plastic sheet material. Wood impregnates the felt with an uncured thermosetting resin and cures the resin to form a hard, cured resin lining. The Wood liner may include a mat or web of randomly orientated fibers which may be of glass and/or synthetic fibers. The Wood web or mat may be needled or carded and may include filamentary reinforcement, and may include a second sheet in the form of a woven scrim. However, the Wood liner does not have the strength, nor is it as flexible, as desired in many applications.

A need exists for an economical reinforcing material that is flexible to accommodate different applications. Similarly, a need exists for a reinforcing liner that provides hoop tensile and bending strength as well as hoop bending stiffness while being stretchable in its circumferential direction to fit to the inner diameter of the host pipe.

SUMMARY OF THE INVENTION

The shortcomings of the prior art are overcome by the disclosed reinforcement liner and methods of manufacturing the liner. The liner includes a fabric material having first and second reinforcing fibers. The first and second fibers are preferably oriented in different directions to provide support to the liner in those directions.

The liner may include a stitching material that is used to couple the first and second fibers together. The stitching material is preferably an elastic yarn.

The liner includes long, chopped strands that are oriented parallel to each other. The long, chopped strands are directed so that they are in the peripheral direction of the finished reinforcement liner. The long, chopped fibers can be distributed continuously or only along portions of the width of the fabric.

The disclosed methods of manufacturing a liner include alternative processes by which the liner can be made. The fabric is manufactured in the form of a continuous roll. One method involves winding the roll in a helical pattern about a fixed mandrel. Another method involves mounting several rolls circumferentially about a mandrel. The rolls are mounted so that strips of fabric from each roll overlap a portion of adjacent fabric strips to provide a continuous liner surface on the mandrel.

BRIEF DESCRIPTION OF THE DRAWINGS

FIGS. 2I–2R are plan views of alternate embodiments of a fabric embodying the principles of the invention.

FIG. 6 is a plan view of an alternative embodiment of a fabric embodying the principles of the invention.

FIG. 7 is a plan view of another alternative embodiment of a fabric embodying the principles of the invention.

DETAILED DESCRIPTION AND PREFERRED EMBODIMENTS OF THE INVENTION

Figure 1A:
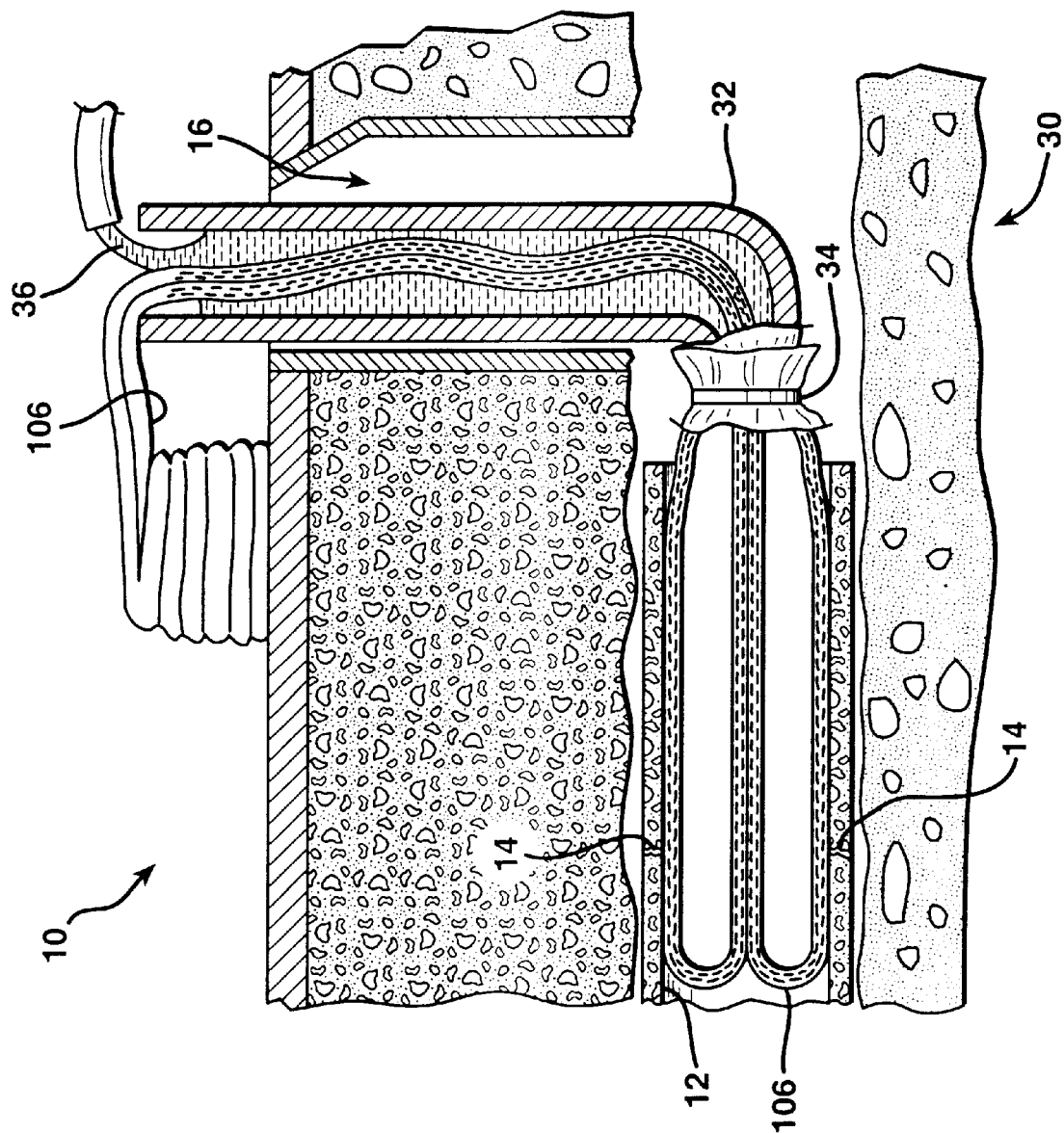
FIGS. 1A and 1B are schematic side views of two installations of a reinforcing liner embodying the principles of the invention.
Figure 1B:
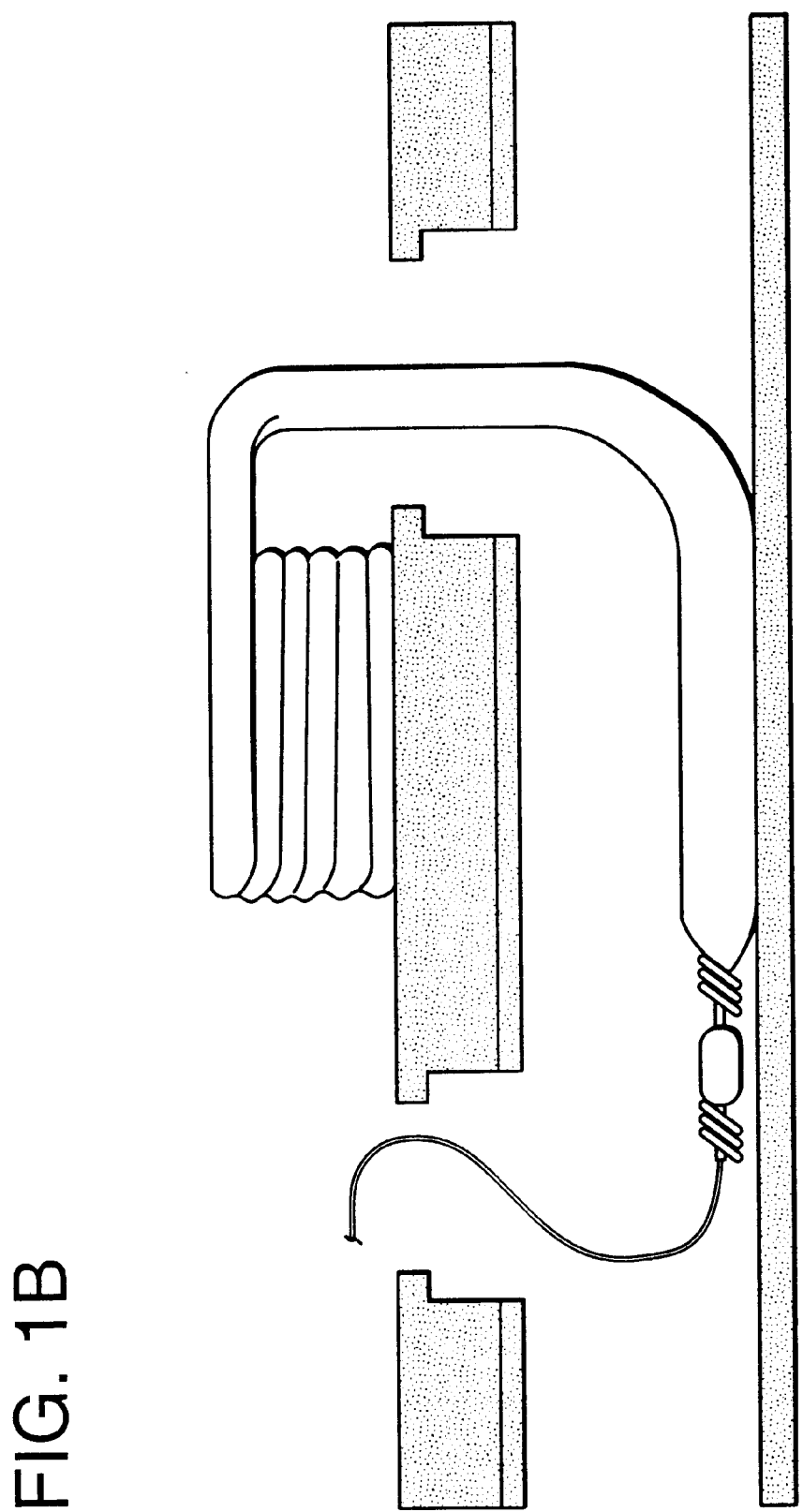

A conventional piping system is shown in FIGS. 1A and 1B. The piping system 10 is installed underground. The piping system 10 includes a pipe 12 and several openings 16. The openings 16 are sized to permit access to the pipe 12 at periodic locations along the length of the piping system 10.

The pipe 12 includes a damaged region 14. The damaged region 14 may include cracks or a weakened or thinned region. Pipe 12 typically sags in a weakened or thin region.

A pipe 12 can be damaged by a variety of forces, including ambient environmental conditions, wear or corrosive material in the piping system, and external loading, porosity and growing roots. The pipe 12 is preferably repaired or rehabilitated to ensure the usefulness and function of the piping system.

One way that a piping system can be repaired is to insert a reinforcement liner in the damaged region of the pipe 12. The reinforcement liner typically provides support in the radial direction to prevent any sagging of the pipe and to cover and seal any cracks in the pipe.

Reinforcement liners typically include a series of reinforcing members that are oriented in the peripheral direction which is perpendicular to the longitudinal axis of the liner. These reinforcing members are disposed about the circumference of the liner and provide radial strength and stiffness to the liner after the liner has been cured and solidified. The reinforcing members are typically filamentary elements, such as glass fibers.

The reinforcement liner also provides support in its longitudinal direction. The liner can include reinforcing members oriented along its longitudinal axis. These reinforcing members are typically filamentary elements, such as glass fibers.

The reinforcement liner should be flexible in the radial direction before curing and should provide stiffness after cure. Flexibility in the radial direction allows the reinforcement liner to expand radially to press against the inner wall of the damaged pipe. Damaged regions of a pipe may have different cross-sectional shapes and contours. Accordingly, the reinforcement liner may not have continuous inner and outer diameters along its length when the liner is positioned and cured.

Glass fibers have a relatively low elongation property. Accordingly, a reinforcement liner with continuous glass fibers oriented in the radial direction of the liner has a limited capability to extend in the radial direction.

The present invention relates to the manufacture of a reinforcement fabric that is stretchable in the warp, weft, or both directions. The fabric, after transformation into a hose shape, is easy to insert into a host pipe and easy to inflate to conform to the diameter of a damaged pipe.

A liner embodying the principles of the invention includes a fabric with continuous fibers oriented along the length of the liner and discontinuous fibers oriented substantially perpendicular to the length of the liner. The different fibers are coupled together to form the fabric. The discontinuous fibers provide flexibility and hoop strength in the radial or peripheral direction of the liner. The liner is formed by overlapping strips of fabric. The strips may be helically wound, circumferentially wound, or longitudinal strips.

With these general principles identified, selected implementations of these principles in currently preferred embodiments are set forth below.

Figure 2:
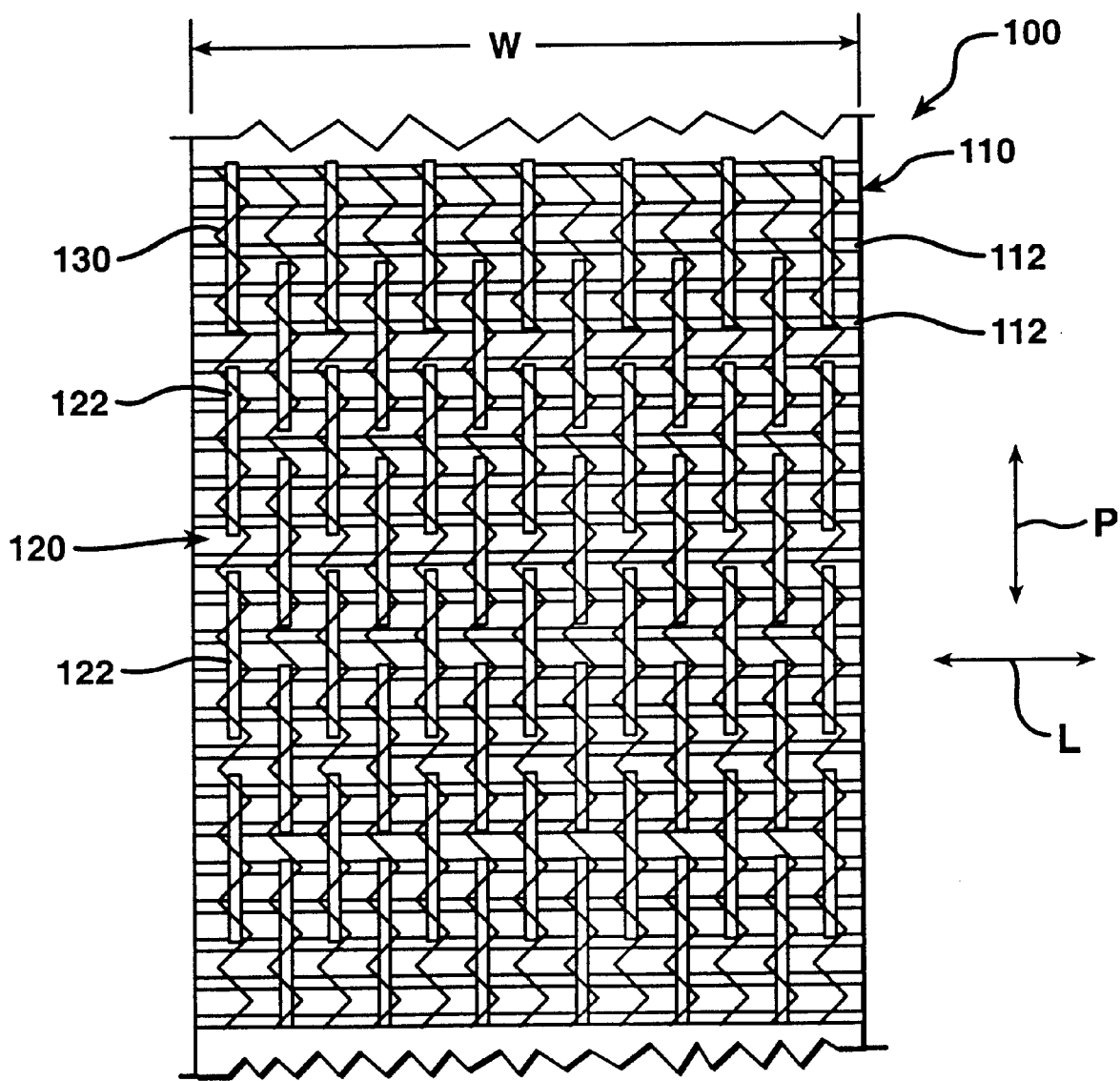
FIG. 2 is a plan view of a preferred embodiment of a fabric embodying the principles of the invention.
Figure 3:
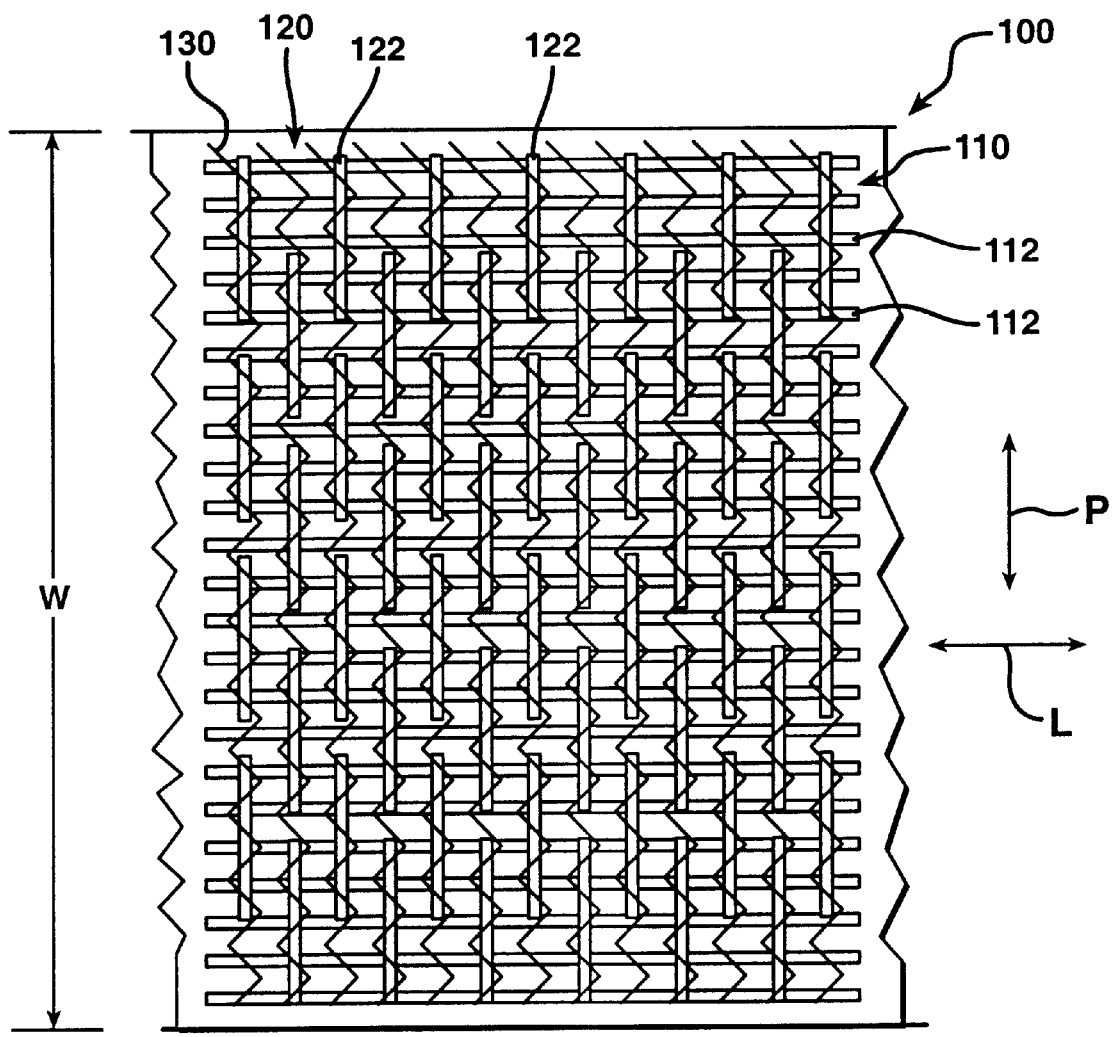
FIG. 3 is a plan view of an alternative orientation of the fabric of FIG. 2.
Figure 4:
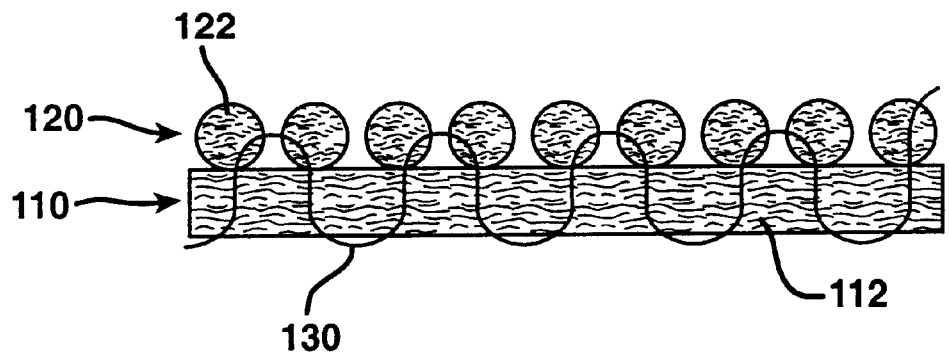
FIG. 4 is a cross-sectional side view of the fabric of FIG. 2.

A liner for reinforcing a tubular member, such as a pipe, embodying the principles of the invention is illustrated in FIGS. 2–18. As shown in FIGS. 2–4, the fabric 100 includes a first support layer 110 and a second support layer 120. The support layers 110, 120 are coupled together by stitching elements 130.

The fabric 100 is formed as a continuous strip of material. The different orientations of support layers 110 and 120 are shown in FIGS. 2–3, in which the width of the fabric is illustrated by "W," depending on the orientation of the fabric in continuous form.

The first support layer 110 includes filamentary elements or fibers 112 that extend in substantially the same direction. Fibers 112 extend in the direction of arrow "L" which represents the longitudinal direction of a finished reinforcing liner. Accordingly, fibers 112 provide strength to the liner in that direction. Depending on the fabric process, fibers 112 may be continuous fibers which are chopped or cut to the width at either or both sides of the fabric, as shown in FIG. 2, or simply bent and folded at either or both sides. Alternatively, fibers 112 may be continuous along the length of the fabric and disposed across the fabric width, as shown in FIG. 3.

The second support layer 120 includes filamentary elements or fibers 122 are disposed in substantially the same direction as each other. As shown in FIG. 2, fibers 122 extend in a direction substantially perpendicular to fibers 112.

Preferably, fibers 112 and 122 are glass fibers, such as E or ECR-type glass fibers. Alternatively, the fibers may include S-2 type of glass fibers, pulp fiber, cotton, polyethylene, polypropylene, polyester, aramide and carbon fibers.

Fibers 122 are long, chopped fibers and are distributed in substantially parallel lines as shown in FIG. 2. In a finished reinforcing liner, fibers 122 preferably extend in the circumferential or peripheral direction of the liner, which is illustrated by arrow "P" in FIGS. 2–3. The orientations of the fibers first layer 110 and the second layer 120 generate a cross-hatching pattern that provides support to the reinforcement liner in the radial and circumferential directions.

The support layers 110, 120 are coupled together by stitching elements 130 as shown in FIG. 4. Stitching elements 130 are stitched or woven through the layers 110, 120 to secure them together.

Stitching elements 130 are flexible to enhance the stretching and pliability of the fabric 100. Preferably, elements 130 are made from an elastic or rubbery-type of material. Alternatively, the elements 130 may be an unstretched polyester yarn or other material that can be stretched.

Accordingly, a preferred liner includes three layers of fibers, a first having a continuous weft in the "L" direction, a second layer comprising short chopped random fibers and a third layer comprising long discontinuous rovings in the "P" direction, the three layers being assembled by stitching. One skilled in the art appreciates that the order of these three layers may be varied (the order in which the layers are stacked), and either of the first or second layers may include the composition of the other layer, or could be deleted entirely, depending upon the requirements of the liner.

Figure 2A:
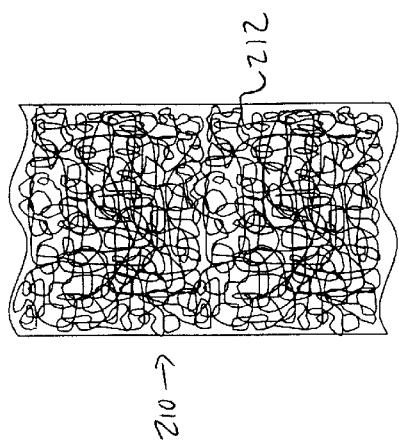
FIGS. 2A–2H are plan views of alternate embodiments of a layer embodying the principles of the invention.
Figure 2B:
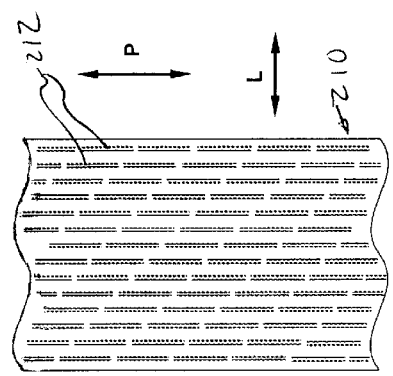
Figure 2C:
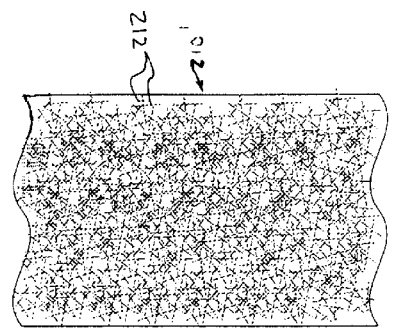
Figure 2D:
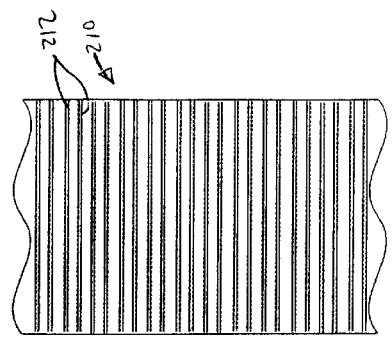
Figure 2E:
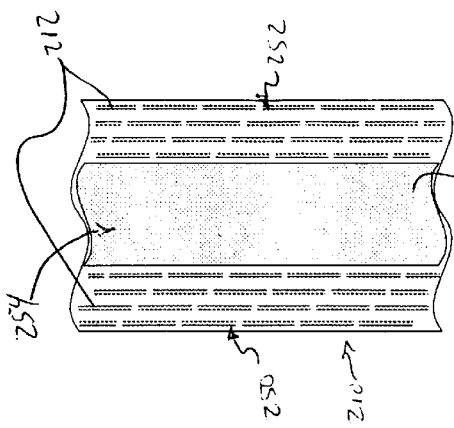
Figure 2F:
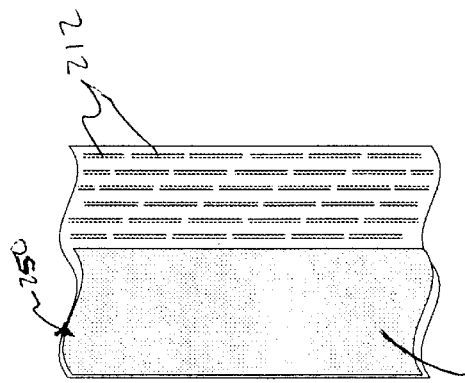
Figure 2G:
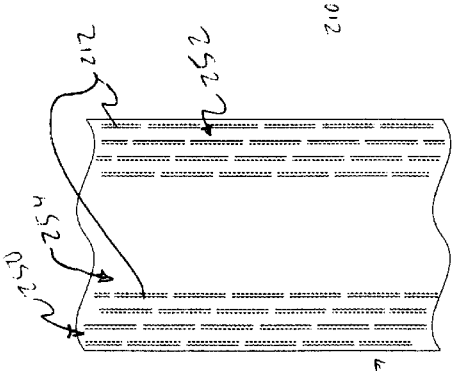
Figure 2H:
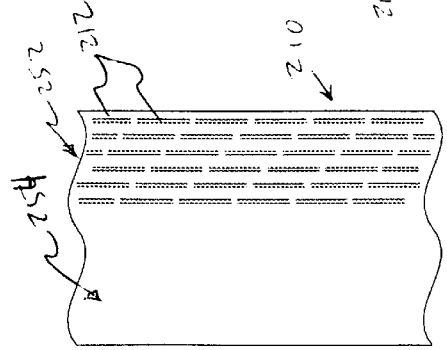

In alternative embodiments, discrete or combined layers 210, each as shown in FIGS. 2A–22H, are made into a fabric 100' in a manner as described above, by combining the layers 210 as shown in FIGS. 2I–2R. FIG. 2A comprises a layer of continuous weft fibers includes either substantially continuous fibers 212 as shown in FIG. 2A, such as glass wool or continuous filament mat. Alternatively, as shown in FIG. 2B, the fibers 212 may comprise generally randomly-oriented, preferably nonwoven, chopped fibers 212. As shown in FIG. 2C, the fibers 212 may comprise generally parallel oriented, preferably nonwoven, chopped fibers 212. As shown in FIG. 2D, the fibers 212 may comprise continuous random fibers, glass mat or polyester felt 212. As shown in FIGS. 2E–2H, the fibers 212 may be distributed over a part of the width of the fabric 210. In particular, the fibers 212 may be distributed over approximately half of the width of the fabric as shown in FIGS. 2E and 2G, or one third (not shown), or approximately two thirds, as shown in FIGS. 2F and 2H. In these embodiments, the thickness of the portion 254 without the fibers 212 is less than that of the fiber-filled portions 250, 252. To compensate for the difference in thicknesses, the unfilled portion 254 may include randomly oriented chopped glass fibers and/or a filler material as shown in FIGS. 2G and 2H. The filler material 256 is embedded in the fabric and is held in place by the support layers. The filler material 256 is included in the middle portion 254 to increase the thickness of the middle portion 254. The fibers 212 may comprise glass or synthetic fibers, such as polyester, nylon or acrylic, as described in U.S. Pat. No. 4,009,063, which is incorporated herein by reference.

Additionally, filamentary elements or fibers 212 in the embodiments shown in FIGS. 2A, 2C and 2E–2H are disposed in substantially the same direction as each other. As shown in FIG. 2C and 2E–2H, fibers 212 extend in the circumferential or peripheral direction of the liner, which is illustrated by arrow "P" as shown adjacent FIG. 2C. As shown in FIG. 2A, the fibers 212 extend in the direction of arrow "L" which represents the longitudinal direction of a finished reinforcing liner. Fibers 212 in FIGS. 2A, 2C and 2E–2H are long, chopped fibers and are distributed in substantially parallel lines as shown in the Figs. and as further described with respect to FIG. 2.

In a manner similar to that described in FIG. 2 above, and as shown in FIGS. 2I–2R, the layer 210 of fibers 212 in any of FIGS. 2A–2H may comprise a first layer, and one or more other of the layers 210 of fibers in any FIGS. 2A–2H may combine additional layer or layers, and the layers may be stitched together as described above with respect to FIG. 2 and FIG. 4, but such stitching is not shown in FIGS. 2I–2R. Alternatively, the second layer 210 of fibers 212 may be adhered to the first layer 210 of fibers 212 in a known manner (e.g. second fibers 212 being applied to the top of a first layer, such as a felt sheet including fibers and preferably adhered using a binder, such as a powder binder, as is known to one skilled in the art). Further, the second layer 210 of fibers 212 may be embedded in a the first layer 210 including the fibers 212 (e.g. a felt layer) in an interlocking manner, such as by needling the long continuous fibers to the felt mat, or by directly including the fibers within the felt mat, or by any known means.

In a manner similar to that noted above, a preferred liner includes three layers, wherein one or more of the first and second layer of continuous weft or random fibers is replaced by a polyester non-woven felt, and such felt may include one or more of the chopped or continuous fibers described herein. Such fibers may be coupled to the felt by a binder adhesive, may be stitched to the felt, or simply held to (or within) the felt layer by a interlocking or interlacing effect.

Preferred combinations include a stitched three-layer liner including the embodiments shown in Table 1 below, and illustrated in FIGS. 2I–2R. One skilled in the art appreciates that "simply interlaced or bonded" includes one later inserted within one or more adjacent layers (e.g. FIG. 2O, layer 2C may be inserted within layer 2D, or in FIG. 2R, layers 2A, 2B and 2C may be inserted within layer 2D, or any similar combinations disclosed herein). Similarly, other combinations of layers 2A–2H would be understood by one skilled in the art to be within the scope of this disclosure. Furthermore, the orientation of the fibers 212 in FIGS. 2A–2R may be changed, for example the fibers 212 illustrated in the P direction in FIG. 2C may be oriented in the L direction, and likewise for the fibers for any of these examples. Further, the embodiments of the layers 210 shown in FIGS. 2E–2H may be substituted preferably for the layer 2C in Table 1, or any other layer, so long as the combination provided the fibers oriented so the liner is stretchable as described in this disclosure.

TABLE 1

| Order of Layers | Ref. FIG. | Combination |
| --- | --- | --- |
| 2A, 2B, 2C | 2I | Stitched |
| 2B, 2A, 2C | 2J | Stitched |
| 2D, 2C | 2K | Stitched |
| 2D, 2A, 2C | 2L | Stitched |
| 2D, 2B, 2C | 2M | Stitched |
| 2D, 2A, 2B, 2C | 2N | Stitched or simply interlaced or bonded |
| 2D, 2C, 2D | 2O | Stitched or simply interlaced or bonded |
| 2D, 2A, 2C, 2D | 2P | Stitched or simply interlaced or bonded |
| 2D, 2B, 2C, 2D | 2Q | Stitched or simply interlaced or bonded |
| 2D, 2A 2B, 2C, 2D | 2R | Stitched or simply interlaced or bonded |

The fabric also includes a resinous material that is cured by the application of energy. The resinous material may be applied onto the glass fibers before winding into a tube. Alternatively, the tube itself may be impregnated all at once. The resinous material cures and bonds with the fibers to provide strength to the liner. The resinous material is preferably an unsaturated polyester resin, modified or not, or a vinylester resin. However, the resinous material may also be a heat curable epoxy resin.

Figure 5:
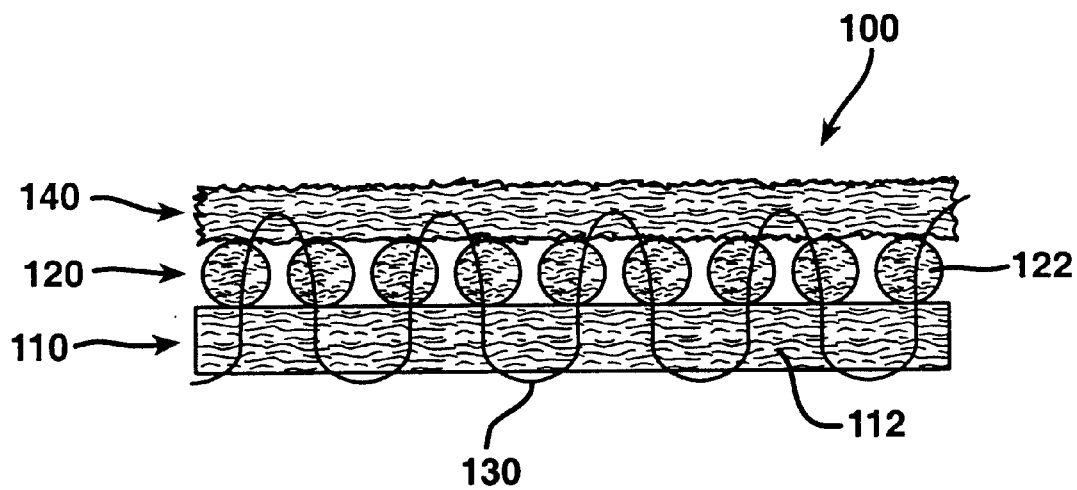
FIG. 5 is a cross-sectional side view of an alternative embodiment of a fabric embodying the principles of the invention.

In an alternative embodiment, the fabric 100 may include a third support layer 140 as shown in FIG. 5. Preferably, layer 140 is a layer of chopped fibers that are randomly oriented and arranged in the form of a mat. Layer 140 is coupled to the first and second layers 110, 120 by stitching elements 130 as previously described. Layer 140 may be on either side of layer 120. Layer 140 may also be positioned between layer 110 and layer 120.

Alternative embodiments of fabrics embodying the principles of the invention are shown in FIGS. 6 and 7. The second support layer 120 may be distributed over the entire width of the fabric or a portion of the width "W."

In FIG. 6, the fibers 122 in the second support layer 120 are distributed over a part of the width of the fabric 102. In particular, the fibers 122 are distributed over approximately half of the width of the fabric.

As described in greater detail below, the distribution of fibers 122 determines the location of the fibers 122 in the finished reinforcing liner. As the liner is manufactured, successive layers of the fabric overlap. Accordingly, the fibers 122 can be placed so that they are on the outer surface of the liner along the periphery of the liner.

Another alternative embodiment of a fabric for a reinforcing liner is shown in FIG. 7. Similar to the previously described embodiment, fibers 122 in the second support layer 120 are distributed over part of the width of the fabric 104.

To simplify the discussion and understanding of the fiber distribution in this embodiment, fabric 104 is divided into three parts: side portions 150, 152 and a middle portion 154. Fibers 122 are distributed in substantially parallel lines in each of the side portions 150, 152 as shown. The relevance of this distribution will be apparent in reference to the description of the manufacture of the liner below.

Generally, the thickness of the middle portion 154 is less than that of the side portions 150, 152 which contain fibers 122. To compensate for the difference in thicknesses, the middle portion 154 includes randomly oriented chopped glass fibers and/or a filler material. The filler material 156 is embedded in the fabric and is held in place by the support layers. The filler material 156 is included in the middle portion 154 to increase the thickness of the middle portion 154.

A variety of materials can be used as filler material 156. Some examples include: resin; calcium carbonate; glass beads or bubbles, which do not necessarily need to be melted; expanded or unexpanded microspheres as supplied by EXPANCEL® (offered by Kemanord AB, Sweden), and a recycled mixture of glass and resin including recycled glass reinforced plastic compound such as shredded sheet material compound (SMC) parts. The microspheres are small spherical polymer shells that encapsulate a gas. When the gas is heated, its pressure increases and the shell softens and expands. For liners that are cured by UV radiation, the filler material is preferably as translucent as possible, for example, bubbles, microspheres, or chopped glass fibers. Alternatively, the filler material may comprise a prefabricated material, such as a fleece or felt material, one example comprising a sheet of such material made from polyester felt interposed between the support layers, the layers being stitched together as described above.

Each fabric is formed as a flat continuous sheet and collected in the form of a roll. The orientations of the support layers in the fabric are determined by the method by which the liner is made. Preferably, the long, chopped fibers 122 are oriented substantially in the peripheral direction of the finished liner. Accordingly, the orientation of the fibers 122 in the formation of the fabric relates to the particular orientation of the fabric roll during the formation of the liner.

Figure 8:
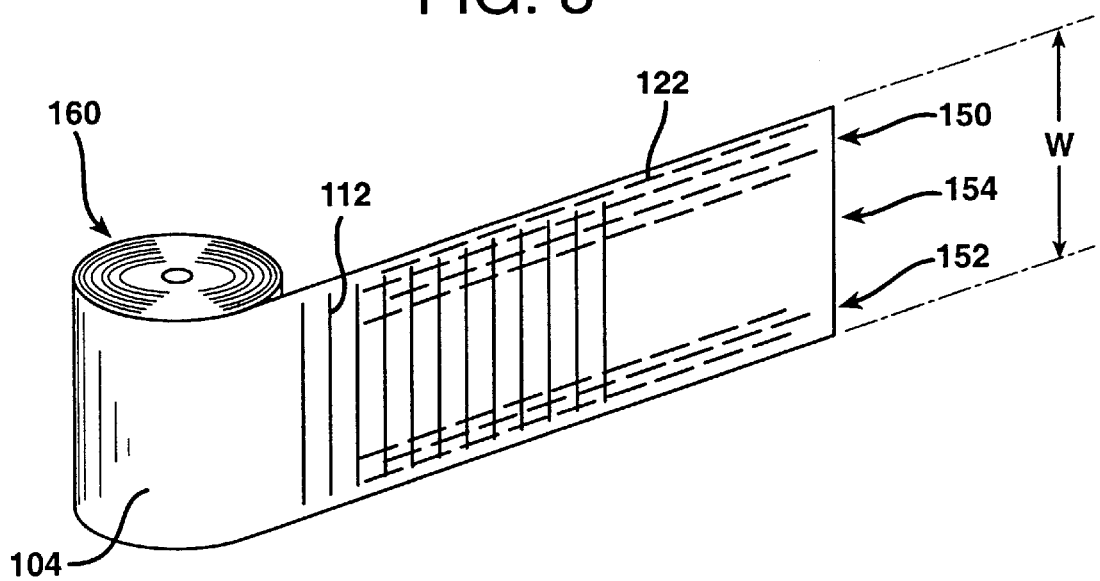
FIG. 8 is a perspective view of a preferred embodiment of a roll of the fabric of FIG. 7.

A roll embodying the principles of the invention is shown in FIG. 8. Roll 160 is a continuous fabric 104 that includes first and second support layers 110, 120 and stitching elements as described above.

Roll 160 includes fibers 112 oriented along the longitudinal axis of the roll. Fibers 112 are fibers that extend substantially across the full width of the fabric. Roll 160 also includes long but discontinuous fibers 122 which are oriented substantially perpendicular to fibers 112. The fabric 104 illustrated in FIG. 8 is representative of the fabric discussed relative to FIG. 7 above. The artisan will appreciate that roll 160 can be formed with any of the three embodiments of fabric illustrated in FIGS. 2–7.

Figure 9:
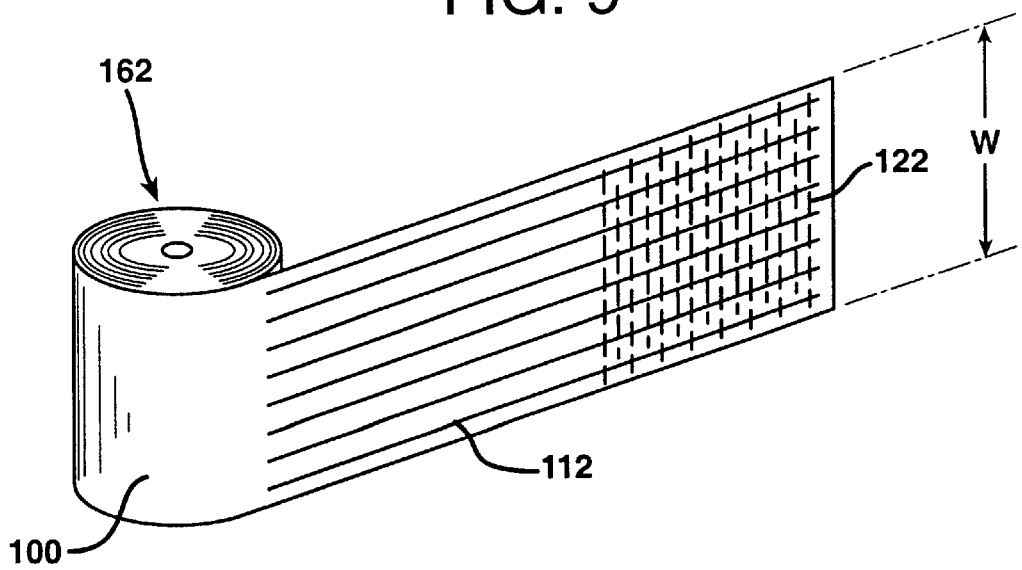
FIG. 9 is a perspective view of an alternative embodiment of a roll of fabric of FIG. 3.

An alternative roll embodying the principles of the invention is shown in FIG. 9. Roll 162 includes a continuous fabric similar to roll 160. However, the orientation of fibers 112 and 122 are changed. Fibers 112 are oriented in a direction perpendicular to the longitudinal axis of the roll 162. Fibers 122 are oriented across the width of the fabric 100, as represented by the arrow "W."

Figure 10:
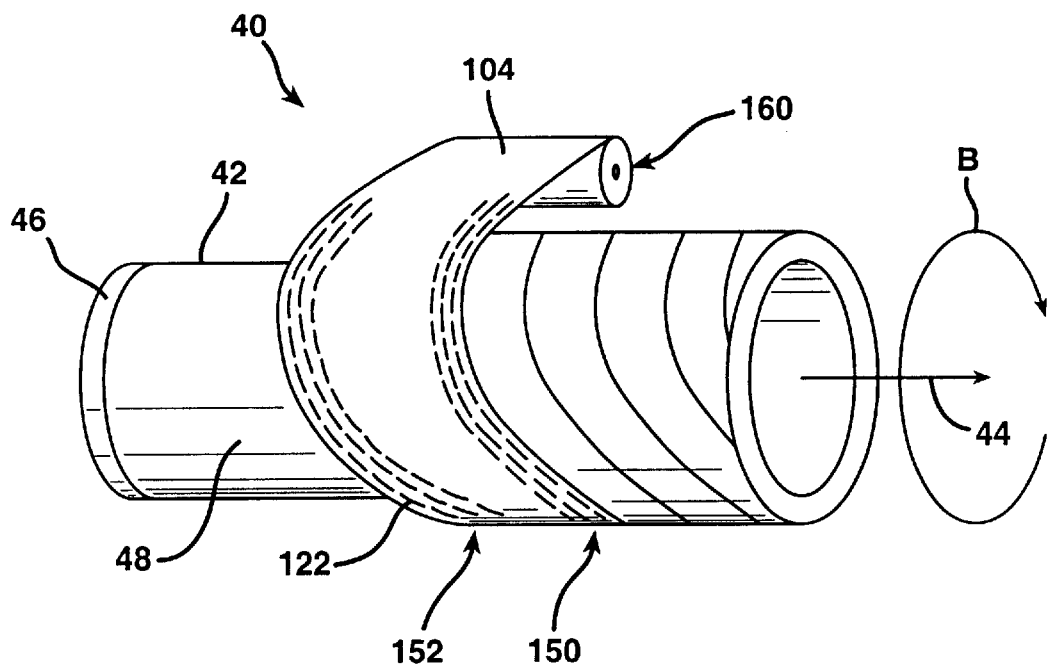
FIG. 10 is a schematic view illustrating a preferred method of manufacturing a reinforcing lining embodying the principles of the invention.

A method of manufacturing a reinforcement liner embodying the principles of the invention is shown in FIG. 10. In this method, the fabric 104 is supplied from a roll onto a forming system. As the artisan will appreciate, the winding method illustrated in FIG. 10 is a conventional manufacturing method. An example of this winding method that is explained in greater detail is disclosed in U.S. Pat. No. 5,798,013 to Brandenburger.

The forming system 40 includes a mandrel 42 that is fixed in position. The mandrel 42 has a longitudinal axis 44 and an outer surface 46. A layer of film 48, preferably a resinous waterproof and resin proof thermoplastic film, is applied to the outer surface 46 of the mandrel.

The roll 160 is rotated circumferentially about the mandrel 42 in the direction of arrow "B" in FIG. 10. The fabric 104 is laid on the film 48 on the mandrel 42 in a helical pattern with successive layers overlapping a portion of the preceding layers and advanced in the direction of the longitudinal axis of the mandrel.

For this method, the fabric may be any of the three embodiments discussed above. For simplicity purposes only, the fabric in FIG. 10 is representative of the fabric 104 shown in FIG. 7.

Figure 11:
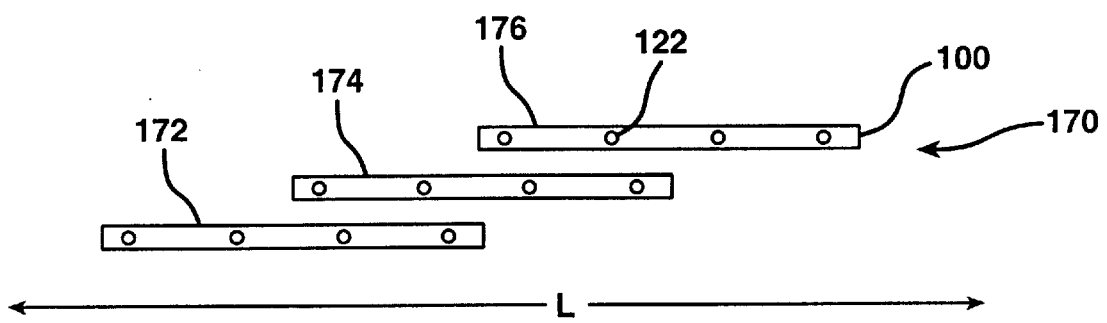
FIG. 11 is a schematic exploded cross-sectional view of a reinforcement liner made with the fabric of FIG. 2.
Figure 12A:
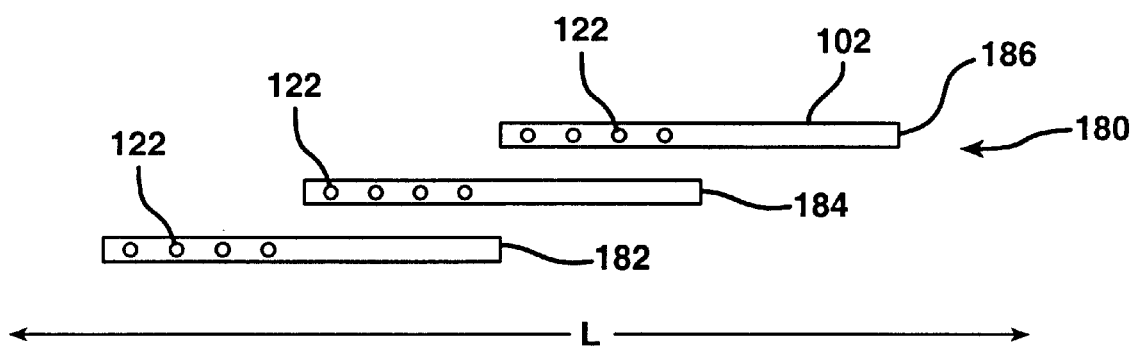
FIGS. 12A and 12B are schematic exploded cross-sectional views of a reinforcement liner made with the fabric of FIG. 6.
Figure 12B:
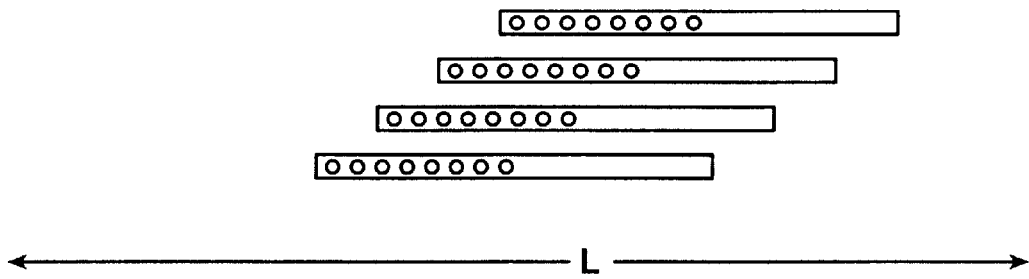
Figure 13:
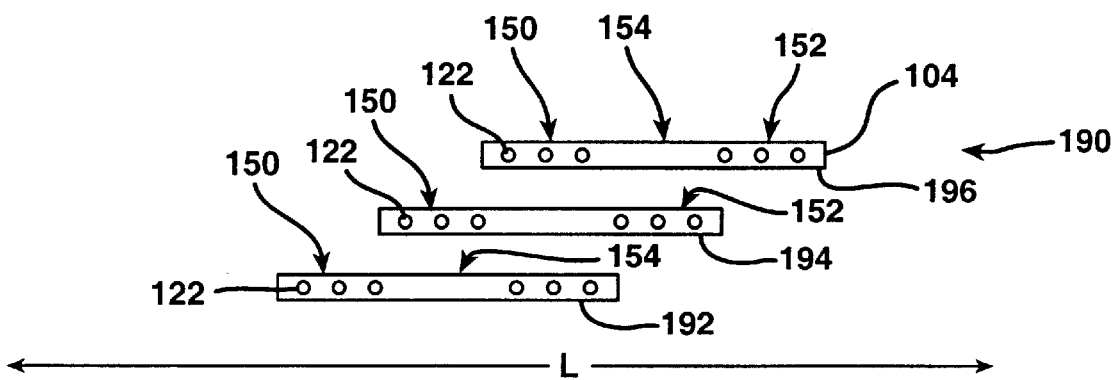
FIG. 13 is a schematic exploded cross-sectional view of a reinforcement liner made with the fabric of FIG. 7.

As an example, the way in which successive layers of fabric overlap is shown in FIGS. 11–13. Each of the liners shown in FIGS. 11–13 is manufactured using the method shown in FIG. 10. Cross-sectional side views of reinforcement liners are shown.

To simplify the discussion of the relationships between the layers, some individual layers are separated. As the artisan will appreciate, the layers are in contact with each other in the finished reinforcement liner. The term "layer" is used to refer to the amount of fabric that is disposed on the mandrel during one revolution of a roll about the mandrel.

A portion of a liner is shown in FIG. 11. Liner 170 includes numerous layers of fabric along its length, including layers 172, 174, and 176. The orientation of the longitudinal axis of the liner is shown as "L".

In the first embodiment of the fabric 100, fibers 122 are distributed along the width of the fabric. Successive layers of fabric preferably overlap at least one of the preceding layers to provide a continuous reinforcement liner surface. Preferably, layer 174 overlaps approximately half of layer 172. Similarly, layer 176 overlaps approximately half of layer 174. The resulting liner 170 has two layers of long, chopped fibers along the length of the liner 170. A liner may be wound be overlapping smaller sections of the fabric, such as ⅓ or ¼ of the fabric width, to build a liner with several layers.

A portion of another liner is shown in FIG. 12A. Liner 180 includes layers 182, 184, and 186 and a longitudinal axis "L". In this embodiment, the fabric 102 is representative of the fabric illustrated in FIG. 6. The fabric 102 includes fibers 122 distributed only over part of the width of the fabric.

Layer 184 is laid on layer 182 so that the portion of layer 184 with fibers 122 covers the portion of layer 182 without fibers 122. Layer 186 is laid similarly on part of layer 184. The resulting reinforcement liner 180 includes an outer surface that is twice the thickness of a single layer of fabric.

The resulting liner 180 has a single layer of fibers 122 continuously on the outer surface of the liner 180 along its length. This structure eliminates any overlapping of fibers 122 between successive layers.

The amount of layer overlap may change to build-up a liner having several layers of fibers 122 covering fibers 122 in other layers as shown in FIG. 12B.

A portion of another liner is shown in FIG. 13. Liner 190 includes layers 192, 194, 196 and a longitudinal axis "L". In this embodiment, the fabric 104 is representative of the fabric shown in FIG. 7. The fabric 104 includes fibers 122 distributed in the side portions 150, 152 of the fabric.

Layer 194 is disposed on layer 192 so that the side portion 150 and middle portion 154 of layer 194 cover the middle portion 154 and side portion 152 of layer 192, respectively. Layer 196 is similarly disposed on layer 194.

The resulting reinforcement liner 190 includes an outer surface that is three times the thickness of a single layer of fabric. Since layers 192, 194, 196 include filler material 156, the uniform thickness of the fabric facilitates the overlapping of the layers as shown in FIG. 13.

Figure 16:
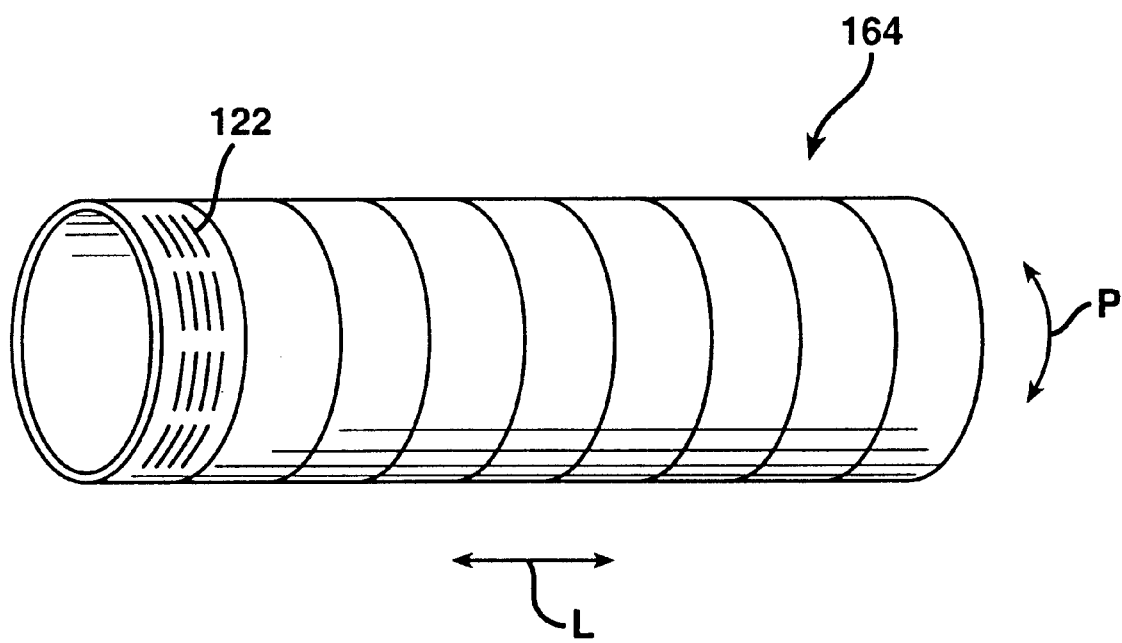
FIGS. 16–18 are perspective views of several embodiments of liners embodying the principles of the invention.
Figure 17:
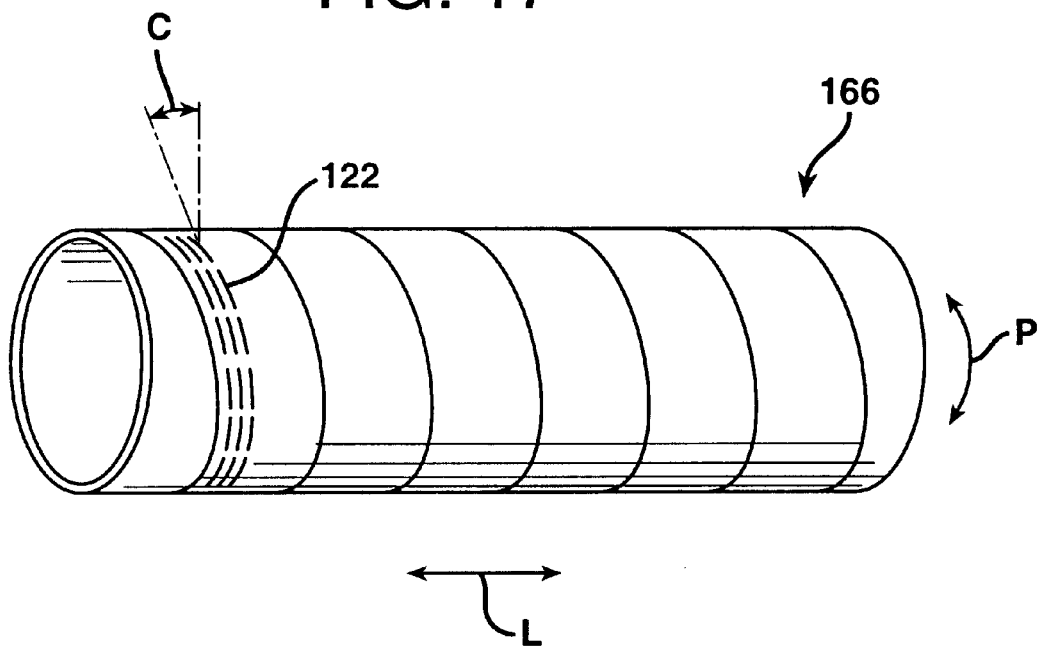

Examples of reinforcement liners manufactured by the method of FIG. 10 are illustrated in FIGS. 16 and 17. Each of the liners includes a series of overlapping strips of fabric.

The orientations of successive layers of fabric in the liner are determined by the relative movement between the rolls and the formed liner. The distance that the roll or the liner moves axially along the longitudinal axis "L" of the liner as the roll disposes a layer of fabric determines the winding angle of the layers. For example, if the liner advances axially while a roll revolves around the liner, the layer of fabric is disposed at an angle of "C" with respect to a plane perpendicular to the longitudinal axis "L."

The liner 164 illustrated in FIG. 16 is manufactured with no advancement of the liner or rolls as the rolls wind fabric onto the mandrel. In the preferred embodiment, the layers of the liner 166 are disposed at an angle "C" as illustrated in FIG. 17. As the artisan will appreciate, the fibers 122 are oriented in a generally peripheral direction of the liner. The deviation from the peripheral direction of the liner 166 is determined by the wind angle "C", the mandrel diameter, the width of the fabric, and the amount of fabric overlap. The variation of one or more of these parameters influences the wind angle "C".

Figure 14:
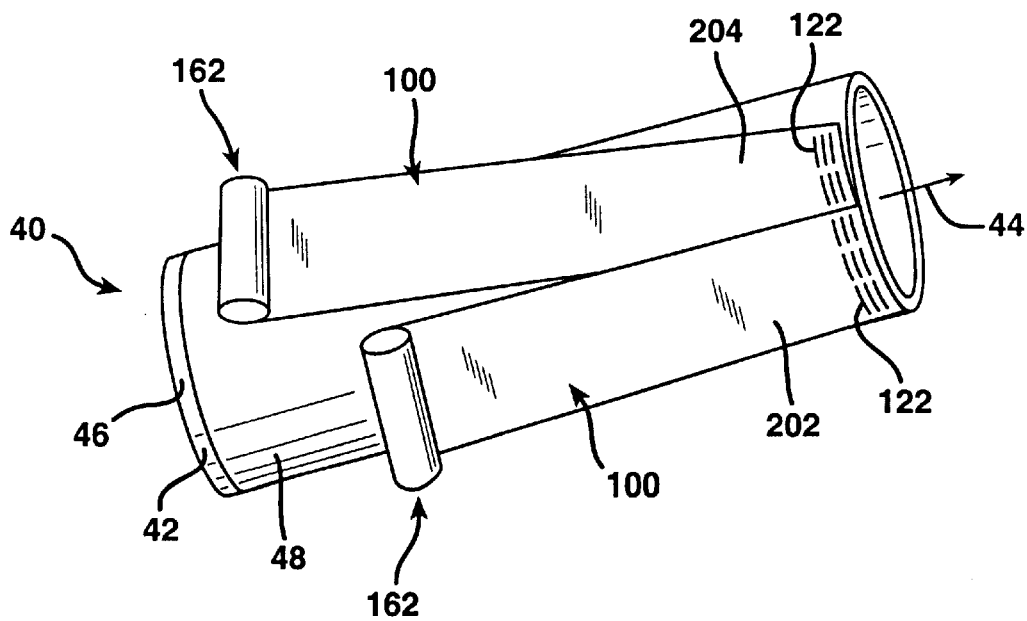
FIG. 14 is a schematic view illustrating an alternative method of manufacturing a reinforcing lining embodying the principles of the invention.

An alternative method of manufacturing a reinforcement liner embodying the principles of the invention is shown in FIG. 14. In this method, the fabric 100 is supplied from several rolls simultaneously onto a forming system. The artisan will appreciate that this is a conventional method as well.

The forming system 40 includes a supporting mandrel 42 with a layer of film 48 positioned on its outer surface 46.

Several pieces of fabric 100 are formed into a corresponding number of rolls 162. Each roll 162 is mounted in a position about the circumference of the mandrel 42. The rolls 162 are coupled to a support device that enables the rolls 162 to unwind and lay the fabric along the direction of the longitudinal axis of the mandrel 42, as appreciated by the artisan. The rolls 162 are positioned so that adjacent strips of fabric overlap each other as shown.

Figure 15:
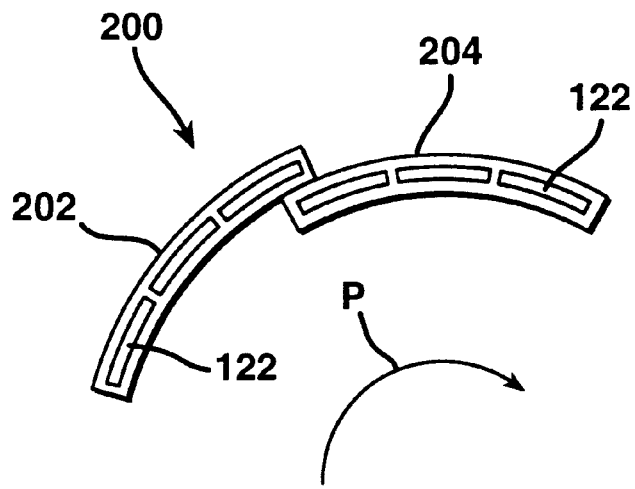
FIG. 15 is a schematic cross-sectional view of a reinforcement liner made with the fabric of FIG. 9.

A portion of a liner formed by the alternative method is shown in FIG. 15. The portion is a cross-sectional end view of a liner with two support layers. The liner 200 includes numerous layers of fabric, including strips 202, 204. Strips 202, 204 are overlapped to provide a continuous, enclosed liner. The strips 202, 204 include fibers 122 which are oriented in the circumferential direction of the liner, which is represented by the arrow "P".

Figure 18:
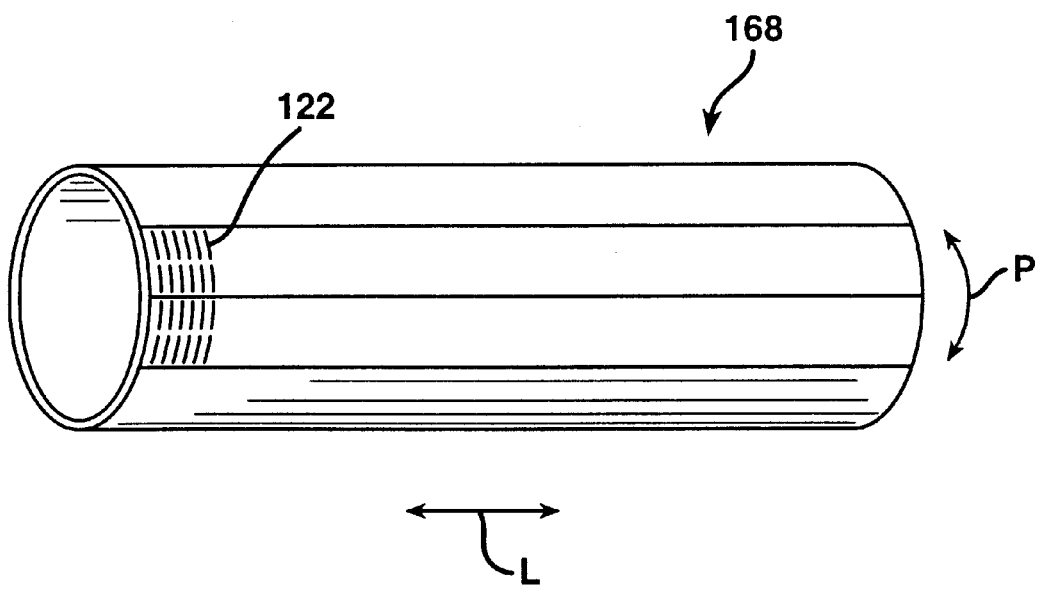

An example of a liner formed by the manufacturing method of FIG. 14 is illustrated in FIG. 18. The liner 168 includes a series of parallel strips of fabric that are oriented in the direction along the longitudinal axis "L" of the liner.

A reinforcing liner may be installed in a damaged pipe by several methods. Exemplary conventional installation methods are illustrated in FIGS. 1A and 1B and are appreciated by the artisan. The methods illustrated in FIGS. 1A and 1B are commonly referred to as "inversion" or "reversion" and "winch-in-place" (WIP) or "winch-through" methods, respectively.

Only the "inversion" method will be described for simplicity reasons. In the method illustrated in FIG. 1A, a reinforcing liner is inserted into an underground pipe 12 using an installation system. The installation system 30 includes a guide tube 32 that is coupled to a collar 34. The guide tube 32 is disposed in an access opening 16 such that the collar 34 is positioned proximate to the damaged pipe 12. The liner 106 is introduced in the guide tube 32 so that its outer surface, which will be laid against the host pipe, serves as an inner surface inside the guide tube. For example, the liner 106 is turned inside out, much like an inverted sock. A medium, such as compressed gas (including air) or a fluid, is introduced into the guide tube 32 to advance the liner 106 into the interior of the damaged pipe. As the medium fills the liner, the liner reverts back to an operational position or configuration.

Due to its circumferential flexibility or stretchability, the reinforcing liner 106 expands so that its outer surface presses against the inner wall of the host pipe 12. The liner 106 extends along the damaged area of the pipe and is expanded to engage the inner periphery of the pipe 12.

The liner 106 is then cured or hardened by applying the appropriate type of energy to cure the energy setting resin. The preferred curing energy is UV radiation, although a certain amount of curing may also be initiated by heat. The liner is preferably cured after it is fully installed. However, as the artisan will appreciate, the liner may be cured as it is installed. The different types of energy that can cure resin include: ultrasound energy, heat by radiation, convection or conduction.

The following ranges of dimensions are provided for an exemplary fabric for a reinforcing liner embodying the principles of the invention:

tex of long, chopped fibers=1650 to 51.7 yield (300 to 9600 tex)

length of long, chopped fibers=2 to 12 inches (5 to 30 cm)

width of fabric=4 to 100 inches (10 to 250 cm)

diameter of reinforced liner=4 to 64 inches (10 to 160 cm)

thickness of fabric=0.02 to 0.4 inches (0.05 to 1.0 cm)

The artisan will appreciate that there are many possible variations on the particular embodiment described above that would be consistent with the principles of the invention. For example, the extent to which the fibers in the first and second support layers are distributed across the width of the reinforcing liner may vary.

The amount of overlap between successive layers of the fabric may be varied to control the position of the long, chopped fibers and the thickness of the resulting reinforcing liner.

The length of the long, chopped fibers and the spacing between lines of those fibers may be varied to adjust the strength of the liner. One skilled in the art appreciates the fibers are normally laid in an overlapping manner during manufacture of the support layer, although the fibers are substantially aligned as described herein. The alignment variation during manufacture typically means the fibers may overlap and the term "spacing", for the purposes of this description, will therefore include such overlap.

The liner may be inserted into the damaged pipe by pulling the liner through the pipe to its desired location and subsequently inflating the liner with a medium such as compressed air instead of inverting the liner.

The strands transverse to the long, chopped rovings may be continuous or discontinuous.

The angle at which the fabric is wound on the mandrel may be adjusted to vary the thickness of the resulting liner.

The thickness of each support layer may be varied to enhance the strength and stiffness properties of the liner. The thickness of the layers is determined by the glass types, quantities, tex. Similarly, several layers of fabric, either identical or different from one another, can be on top of each other to obtain the final liner thickness and desired liner construction.

The liner may include a surfacing veil, such as a thin glass veil or a polyester fiber veil.

What is claimed is:

1. A continuous fabric having a length for forming a support for reinforcing a pipe having a circumference comprising:

a first layer, said first layer including first fibers;

a plurality of second fibers coupled to said first layer, said second fibers including chopped fibers in substantially parallel alignment for use in said pipe, said fibers aligned for being positioned substantially about the circumference of said pipe, whereby said fabric can be elongated in a direction parallel to said second fibers.

2. The fabric of claim 1, wherein said first fibers are substantially randomly oriented.

3. The fabric of claim 2, wherein said first fibers are discontinuous fibers.

4. The fabric of claim 2, wherein said second fibers are non-woven fibers made from one of glass or polyester.

5. The fabric of claim 1, wherein said first fibers are substantially continuous fibers.

6. The fabric of claim 1, wherein the fabric has a width and said second fibers are distributed across a portion of the width of the fabric.

7. The fabric of claim 6, wherein said second fibers are distributed substantially perpendicular to the width of the fabric.

8. The fabric of claim 7, wherein said second fibers are disposed across approximately half of the width of the fabric.

9. The fabric of claim 6, wherein the fabric includes side portions and a middle portion therebetween, and said second fibers are disposed only in said side portions of the fabric.

10. The fabric of claim 9, further comprising:

a filler material positioned in said middle portion.

11. The fabric of claim 10, wherein said filler material includes one of: resin, glass, a shredded recycled glass reinforced plastic compound, and microspheres.

12. The fabric of claim 1, further comprising a stitching element for coupling said fibers, wherein said stitching element comprises a yarn that is elastic.

13. The fabric of claim 1, further comprising a third layer comprising randomly oriented chopped third fibers, wherein said third layer is coupled to said first and second fibers.

14. The fabric of claim 13 wherein said third layer comprises a length, and said third fibers are substantially continuous and oriented substantially perpendicular to the length of the third layer.

15. The fabric of claim 13 wherein said second and third fibers are interlocked within the first layer.

16. The fabric of claim 13 wherein said second and third fibers are interlocked within the second layer.

17. The fabric of claim 13, wherein said third fibers are oriented at an angle with respect to said second fibers.

18. The fabric of claim 17 wherein said first layer comprises a length, and said first fibers are substantially continuous and oriented substantially perpendicular to the length of the first layer.

19. The fabric of claim 1, further comprising a third layer comprising chopped third fibers oriented at an angle with respect to said second fibers, said third fibers being aligned substantially parallel to each other and perpendicular to the length of the sheet, said third layer being coupled to said first and second fibers.

20. The fabric of claim 1, further comprising a third layer comprising chopped third fibers oriented at an angle with respect to said second fibers, said third fibers being aligned substantially parallel to each other and perpendicular to the length of the sheet, said third layer being coupled to said first and second fibers.

21. The fabric of claim 1, wherein said first fibers are non-woven fibers made from one of glass or polyester felt.

22. The fabric of claim 1 wherein the first and second fibers are coupled with a powder binder.

23. The fabric of claim 1 wherein the second fibers are provided in a second layer and coupled to the first layer by stitching.

24. The fabric of claim 1 wherein the liner is radially expansible.

25. A support for reinforcing a pipe comprising:
a reinforcement liner substantially configured in the form of a tube, said tube having a length disposed along a longitudinal axis and a peripheral direction in a plane perpendicular to said longitudinal-axis, said liner including a fabric with a first layer having randomly oriented fibers and a plurality of second fibers comprising chopped fibers aligned in substantially the same direction, said first and second fibers being coupled together, wherein said fabric is disposed as layered, overlapping strips to produce the tube, and said fabric can be elongated in a direction parallel to said second fibers.

26. The support of claim 25, wherein said fabric is disposed in a helical pattern along the length of said tube.

27. The support of claim 26, wherein said chopped fibers are substantially oriented along the peripheral direction of the tube.

28. The support of claim 25, wherein said fabric is disposed as longitudinal strips along the length of said tube.

29. The support of claim 25, wherein said fabric includes a width direction and said chopped fibers are disposed substantially perpendicular to said width direction.

30. The support of claim 25, wherein each successive layer of said fabric contacts a preceding layer so that a portion of a successive layer with said chopped fibers contacts a portion of the preceding layer without said chopped fibers.

31. The support of claim 30, wherein said fabric includes side portions and a middle portion therebetween, said chopped fibers are disposed only along said side portions of said fabric, and each successive layer of said fabric contacts a preceding layer so that a side portion of a successive layer overlaps a middle portion of a preceding layer.

32. The support of claim 25, wherein said tube includes a resinous film extending along an inner surface of said fabric.

33. The support of claim 25, wherein said tube is stretchable in a radial direction of said tube.

34. The support of claim 25, wherein said second fibers comprise a second layer and said first and second layers are coupled by a stitching element.

35. A method of manufacturing a support for reinforcing a pipe comprising the steps of:
disposing a fabric in a first layer made from randomly-oriented fibers; and
disposing the fabric in a second layer overlapping a portion of the first layer, wherein the first layer and the second layer form a reinforcement liner substantially configured in the form of a tube, the tube has a longitudinal axis and a peripheral direction in a plane perpendicular to the longitudinal axis, the fabric comprising a first layer and a second layer, the first and second layers coupled together by a stitching element, the second support layer includes chopped fibers aligned in substantially the same direction, and said fabric can be elongated in a direction parallel to said chopped fibers.

36. The method of claim 35, wherein said steps of disposing a fabric in first and second layers includes disposing the fabric in a helical pattern along the longitudinal axis.

37. The method of claim 35, wherein said steps of disposing a fabric in first and second layers includes disposing the fabric in longitudinal strips along the longitudinal axis.

38. The method of claim 35, further comprising the step of:
coupling the first and second layers by impregnating the first and second layers with a resinous material.

39. The method of claim 35, wherein said chopped fibers are aligned substantially perpendicular to said longitudinal axis.

40. The method of claim 39, wherein said fabric is stretchable in a radial direction.

41. A support for reinforcing a pipe comprising:
a reinforcement liner substantially configured in the form of a tube, said tube having a longitudinal axis and a radial direction in a plane perpendicular to said longitudinal axis, said liner including a fabric with a first layer and a second layer, said first and second layers coupled together by a stitching element, said second layer including chopped fibers aligned substantially circumferentially about the tube, wherein said fabric is disposed as layered, overlapping strips to produce the tube, and said fabric can be elongated in the radial direction.

* * * * *